United States Patent
Lee et al.

(10) Patent No.: US 6,256,488 B1
(45) Date of Patent: Jul. 3, 2001

(54) DIALING METHOD IN WIRELESS LOCAL LOOP TERMINAL

(75) Inventors: Sang-Seol Lee; Jae-Sung Jang, both of Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/366,298

(22) Filed: Aug. 2, 1999

(30) Foreign Application Priority Data

Aug. 1, 1998 (KR) .................................................. 98-31446

(51) Int. Cl.$^7$ ............................. H04Q 7/20; H04M 11/00
(52) U.S. Cl. ........................ 455/401; 455/564; 455/565; 379/360
(58) Field of Search ................................. 455/564, 565, 455/401, 418, 403; 379/360, 361

(56) References Cited

U.S. PATENT DOCUMENTS

| | | | |
|---|---|---|---|
| 5,369,697 | * 11/1994 | Murray et al. | 379/361 |
| 5,438,618 | * 8/1995 | Jantzi et al. | 379/387 |
| 5,636,270 | * 6/1997 | Davey | 379/352 |
| 5,689,557 | * 11/1997 | Kaplan | 379/355 |
| 5,706,341 | * 1/1998 | Zabel et al. | 379/361 |
| 5,781,625 | * 7/1998 | Sizer | 379/257 |
| 5,799,254 | * 8/1998 | Karmi et al. | 455/528 |
| 5,812,651 | * 9/1998 | Kaplan | 379/200 |
| 5,878,131 | * 3/1999 | Boie | 379/361 |
| 5,884,148 | * 3/1999 | Bilgic et al. | 455/74.1 |

* cited by examiner

Primary Examiner—Edward F. Urban
Assistant Examiner—Marceau Milord
(74) Attorney, Agent, or Firm—Dilworth & Barrese, LLP

(57) ABSTRACT

A method for processing a dialed signal in a WLL terminal. Upon sensing of an off-hook state of a telephone connected by wires to a WLL terminal, a DTMF signal corresponding to a key input from the telephone is generated and it is converted into a digital signal. If the digital signal is not a predefined specific key, the digital signal is stored in a dial buffer. If the digital signal is a predefined specific key, the DTMF signal corresponding to the digital signal stored in the dial buffer is sequentially generated to be radio-transmitted.

6 Claims, 2 Drawing Sheets

DIALING METHOD IN WIRELESS LOCAL LOOP TERMINAL

PRIORITY

This application claims priority to an application entitled "Dialing Method in Wireless Local Loop Terminal" filed in the Korean Industrial Property Office on Aug. 1, 1998 and assigned Ser. No. 98-31446, the contents of which are hereby incorporated by reference.

BACKGROUND OF THE INVENTION

1. Field of the Invention

The present invention relates to an apparatus and method for enabling a wireless local loop (WLL) terminal to process dial signals received from a wire telephone, and more particularly, to a dialing method for recognizing the end of a dialing sequence by detecting a specific key input.

2. Description of the Related Art

A wired telephone, as well as a wireless local loop (WLL) telephone, are connected to a WLL terminal via a tip terminal T and a ring terminal R.

FIG. 1 shows a configuration of a WLL terminal to which a wire telephone (e.g., a public telephone) is connected. The wired telephone requires, in addition to the tip terminal T and the ring terminal R, a subscriber line interface circuit (SLIC) as shown in FIG. 1.

In operation, when a wire telephone 100 is in an off-hook state, the loop current varies. A signal line indicating circuit (SLIC) 25 in a WLL terminal 200 detects the off-hook state of the telephone 100 as a consequence of the change in the loop current. In the off-hook state, if a subscriber dials a telephone number, a dual tone multifrequency (DTMF) signal corresponding to each dialed key is sent to the SLIC 25 via the tip terminal T and ring terminal R connections as shown in FIG. 1. The DTMF signal is supplied from the SLIC 25 to a DTMF receiver 26 where it is converted into a digital signal. A controller 27 temporarily stores the digital signal received from the DTMF receiver 26 in an internal dial buffer 27a. Upon detecting completion of dialing, the controller 27 reads the stored digital signal and supplies the read digital signal to a DTMF generator 27b where a DTMF signal is generated from the received digital signal to be supplied to a radio transmitter/receiver (hereinafter, referred to as an RF (Radio Frequency) circuit 28. The RF circuit 28 modulates the received DTMF signal and wirelessly transmits the modulated signal.

To detect the end of the dialing sequence, a timer is required. After recognizing a single key input, the controller 27 activates the timer and checks whether the next key is input within a prescribed time (e.g., 5 seconds). If there is no key input received within the time interval, it is judged that dialing has been completed.

In the case where the timer is used, a long timer check time may increase a long loop linking time; however, a short timer check time may cause mis-recognition in detecting end of dialing when there is a pause in dialing.

SUMMARY OF THE INVENTION

It is, therefore, an object of the present invention to provide a method for accurately and rapidly processing dial signals received from a wire telephone in a WLL terminal.

It is another object of the present invention to provide a method for increasing accuracy and loop linking speed in processing dialed signals in a WLL telephone.

In accordance with one aspect of the present invention, a method for processing dialed signals from a telephone connected to a WLL terminal by wires includes the steps of: sensing whether the telephone is in an off-hook state; if the telephone is in an off-hook state, receiving a DTMF signal corresponding to a key input from the telephone; converting the DTMF signal into a digital signal; checking whether the digital signal is a predefined specific key, and if the digital signal is not a predefined specific key, storing the digital signal in a dial buffer and returning to the receiving step; and if the digital signal is a predefined specific key, sequentially generating the DTMF signal corresponding to the digital signal stored in the dial buffer to radio-transmit the DTMF signal.

In accordance with another aspect of the present invention, a method for processing dialed signals from a WLL telephone includes the steps of: sensing whether a handset is in an off-hook state; if the handset is in an off-hook state, generating a DTMF signal corresponding to a key input from a keypad; converting the DTMF signal into a digital signal; checking whether the digital signal is a predefined specific key, and if the digital signal is not a predefined specific key, storing the digital signal in a dial buffer and returning to the receiving step; and if the digital signal is a predefined specific key, sequentially generating the DTMF signal corresponding to the digital signal stored in the dial buffer to radio-transmit the DTMF signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, numerous specific details are set forth to provide a more thorough understanding of the present invention. It will be apparent, however, to one skilled in the art that the present invention may be practiced without these specific details. In other instances, well known constructions or functions are not described in detail so as not to obscure the present invention.

Figure 1:
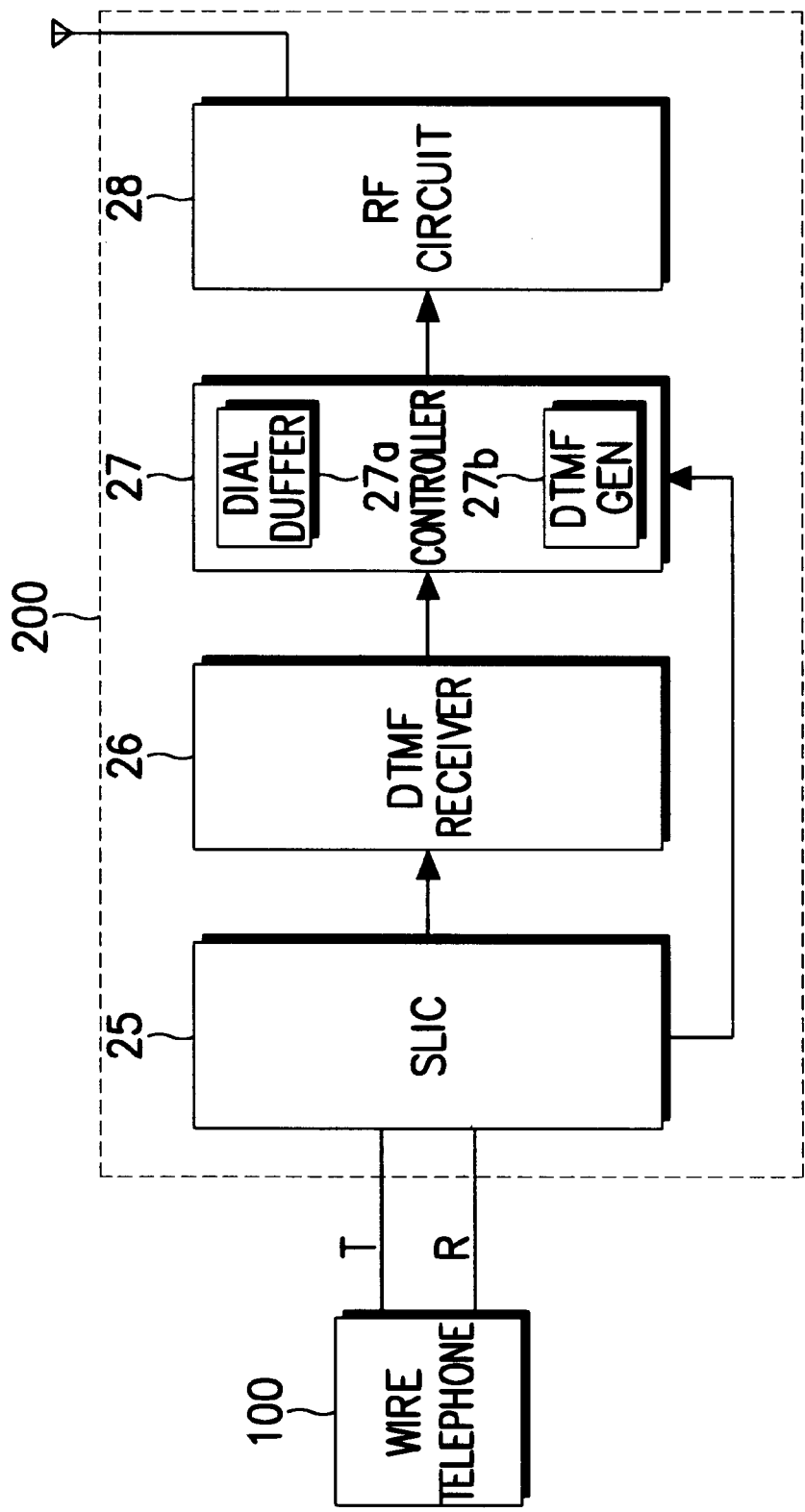
FIG. 1 is a block diagram illustrating a WLL terminal to which a wire telephone is connected according to the present invention.
Figure 2:
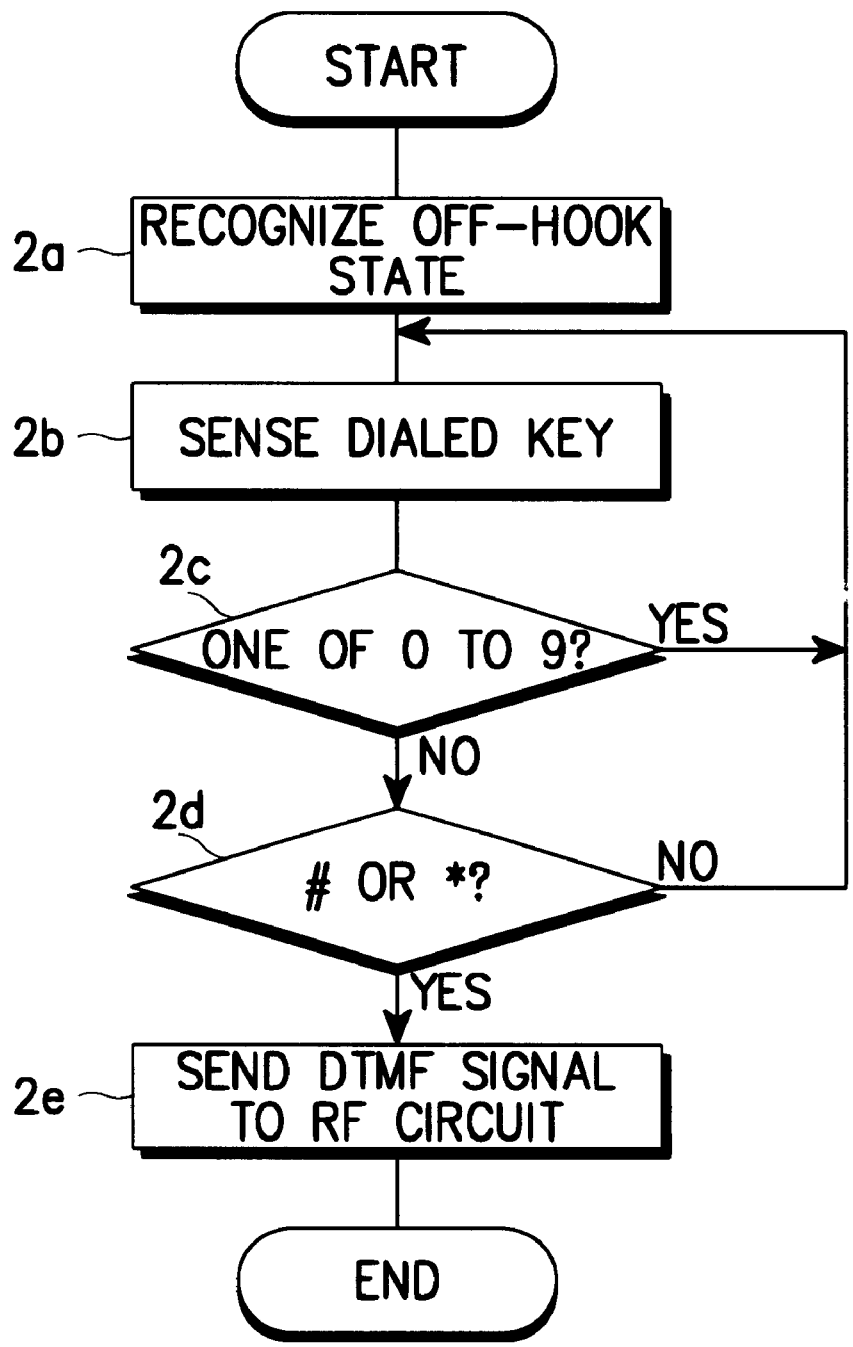
FIG. 2 is a flow chart illustrating a dialed signal processing procedure in a WLL terminal according to a preferred embodiment of the present invention.

The apparatus and method of the present invention will be described with reference to FIGS. 1 and 2, where FIG. 1 shows a configuration of a WLL terminal to which a wire telephone is connected; and where FIG. 2 illustrates a dialed signal processing procedure in the WLL terminal to which a wire telephone is connected. It should be noted that the present invention may also utilize a public telephone instead of a wire telephone in an alternate embodiment. The same procedures are applicable to the WLL terminal to which a public telephone is connected.

Referring to FIGS. 1 and 2, if the telephone 100 is in an off-hook state, a loop current varies, and the SLIC 25 in the WLL terminal 200 recognizes the off-hook state (i.e., loop current variation) of the telephone 100. The SLIC 25 supplies the off-hook state status directly to the controller 27. Recognition of the off-hook state by the controller 27 is illustrated at step 2a of FIG. 2. If a subscriber presses a numeric key on the telephone 100 in order to dial a telephone number, a DTMF signal corresponding to the pressed numeric key is generated by the telephone and is supplied to the DTMF receiver 26 through the SLIC 25. The DTMF receiver 26 in turn converts the received DTMF signal into a digital signal and supplies the digital signal to the controller 27.

The controller 27 senses the dialed key at step 2b and checks whether the dialed key is a recognized key (i.e., 0 to 9) by analyzing the digital signal at step 2c. If the dialed key is one of the dial keys, the controller 27 returns to step 2b, and if not, it checks whether the dialed key is a predefined specific key (e.g., # or *) at step 2d. If the dialed key is a predefined specific key, the controller 27 judges that dialing has been completed and supplies the digital signal stored temporarily in the dial buffer 27a to the DTMF generator 27b. The DTMF generator 27b then generates and sends a DTMF signal corresponding to the received digital signal to the RF circuit 28 at step 2e. The RF circuit 28 modulates the DTMF signal into an RF signal and transmits the modulated DTMF signal through an antenna. Otherwise, if the dialed key is not a predefined specific key, determined at step 2d, the controller 27 judges that dialing has not been completed and returns to step 2b to sense a next dialed key.

Although the above description has been given for the wire telephone or public telephone, a WLL telephone may also be used in an alternate embodiment. When a WLL telephone is used, it is not separated from the WLL terminal but rather unified within the WLL terminal.

In the WLL telephone embodiment, the controller 27 checks whether a handset is in an off-hook state. If the off-hook state is sensed, a DTMF signal corresponding to a key input through a keypad is generated. The DTMF signal is converted into a digital signal. The digital signal is checked to determine whether it is a predefined specific key (# or *). If the digital signal is not a predefined specific key, the digital signal is stored in the dial buffer. The above operation is repeated each time a key input is sensed through the keypad. At the point where the digital signal is judged to be a predefined specific key, the DTMF signal corresponding to the digital signal stored in the dial buffer is sequentially transmitted.

As described above, since there is no need for checking a dialing time by the timer, the accuracy in processing dialed signals by the WLL terminal can be improved.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for processing dialed signals from a dialing device connected to a wireless local loop (WLL) terminal, comprising the steps of:

sensing whether the dialing device is in an off-hook state;

receiving a dual tone multifrequency (DTMF) signal from the dialing device corresponding to a key input;

converting the DTMF signal into a digital signal;

determining whether the digital signal corresponds to a predefined specific key, i. storing the digital signal in a dial buffer and returning to the receiving step when the digital signal does not correspond to the predefined specific key, and ii. immediately generating a DTMF sequential signal corresponding to a sequence of any number of digital signals stored in the dial buffer and radio-transmitting the DTMF sequential signal when the key input corresponds to the predefined specific key, indicative of an end of a dialing sequence.

2. The method as claimed in claim 1, wherein when the digital signal is determined not to be a predefined specific key, it is a digit key between zero and nine.

3. The method as claimed in claim 1, wherein the dialing device is one of a wire telephone and a public telephone.

4. The method as claimed in claim 1, wherein the off-hook state is sensed as a variation in loop current.

5. A method for processing dialed signals in a wireless loop (WLL) telephone including a handset, and a keypad for receiving key inputs, said method, comprising the steps of:

sensing whether a handset is in an off-hook state;

generating a dual tone multifrequency (DTMF) signal corresponding to a key input from a keypad, if the handset is in an off-hook state;

converting the DTMF signal into a digital signal;

determining whether the digital signal corresponds to a predefined specific key, i. storing the digital signal in a dial buffer and returning to the receiving step if the digital signal does not correspond to the predefined specific key; and ii. immediately generating the DTMF signal corresponding to the digital signal stored in the dial buffer to radio-transmit the DTMF signal if the digital signal corresponds to the predefined specific key, indicative of an end of a dialing sequence.

6. The dialing method as claimed in claim 5, wherein when the digital signal is determined not to be a predefined specific key, it is a digit key between zero and nine.

* * * * *